W. K. Foster,
Casting Pencil Sharpeners.
Nº 528. Reissued Feb. 23, 1858.
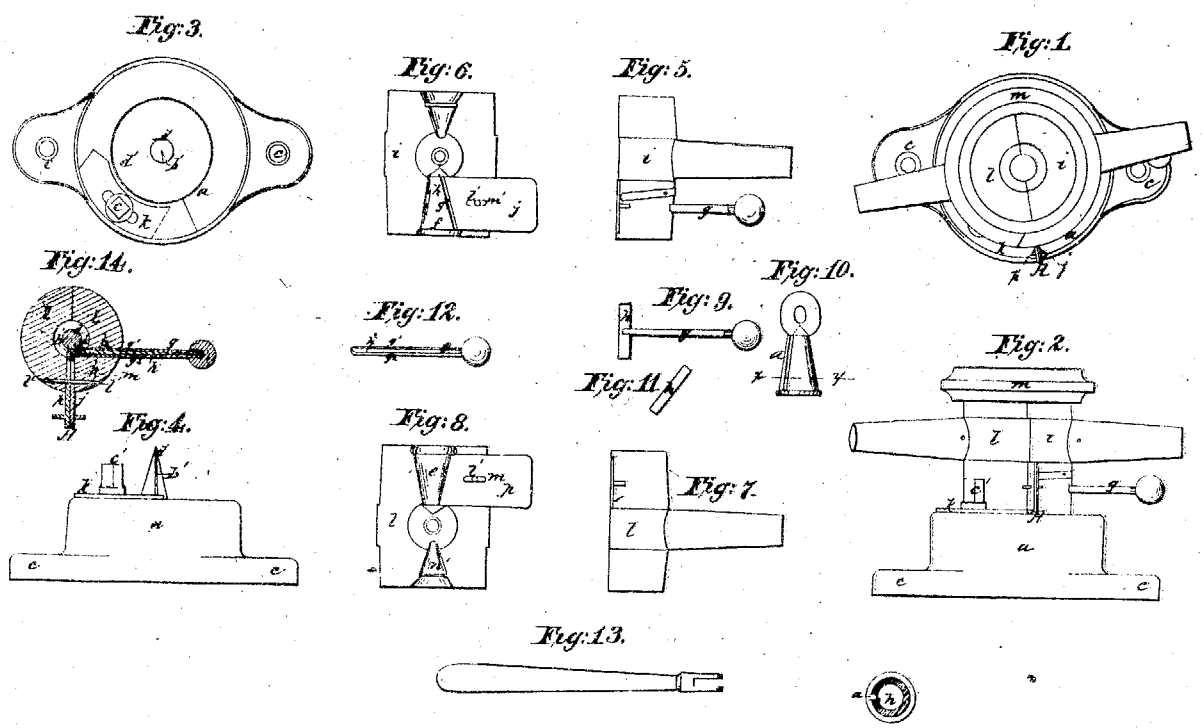

BEST AVAILABLE COPY

UNITED STATES PATENT OFFICE.

WALTER K. FOSTER, OF BANGOR, MAINE.

IMPROVEMENT IN MOLDS FOR CASTING PENCIL-SHARPENERS.

Specification forming part of Letters Patent No. 12,722 dated April 17, 1855; Reissue No. 528, dated February 23, 1858.

*To all whom it may concern:*

Be it known that I, WALTER K. FOSTER, of Bangor, in the county of Penobscot and State of Maine, have invented a new and useful Mold or Apparatus for Manufacturing Pencil-Sharpeners or Instruments for Sharpening Lead-Pencils; and I do hereby declare that the same is fully described and represented in the following specification and the accompanying drawings, of which—

Figure 1 denotes a top view of the said mold or apparatus; Fig. 2, a side elevation of it; Fig. 3, a top view of its base-plate, adjustable gage, and conical core. Fig. 4, is a side elevation of said base-plate or base, gage, and core. Fig. 5 is a side view of one of the mold-sections which is supported on the base-plate. Fig. 6 is an inside view of said mold-section. Fig. 7 is an elevation of the other mold-section as it appears when turned bottom upward. Fig. 8 is an inside view of this latter mold-section. Fig. 9 is a side view of the spring-nippers *g*, to be hereinafter described, such being represented as holding a knife or cutter, *h*. Fig. 10 is a representation of the pencil-sharpener as made in such mold. Fig. 11 is a view of the knife or cutter of said sharpener. Fig. 12 is a top view of the spring-nippers and their slider. Fig. 13 is a representation of a pry or lever used in moving the throat slides. Fig. 14 is a horizontal section of the mold taken through the nippers.

In the construction of the said mold or apparatus it is made of a base-plate or base, *a*, two halves or sections, *i l*, separate from the base-plate and resting thereon, a throat-slide, A, and a conical core, *d*, attached to and extending upward from the base-plate.

The two sections *i l*, when arranged on the base-plate, as shown in Fig. 2, are held together by an annulus or ring, *m*, slipped upon them.

In order to enable the base-plate to be fastened to a bench it may be constructed with two or any other suitable number of ears, *c c*, provided with holes for the passage of screws through them. Each half or section *i l* of the upper part of the mold is constructed with a semi-matrix, of proper form for the production of the body of the pencil-sharpener, whose throat *a'*, Fig. 10, is formed by casting the metal against the throat-slide A, which may be made in one piece of metal, or it may be constructed of two pieces or plates, *j p*, applied, respectively, to the two parts *i l* of the mold, and so adapted to them as to be capable of being slid toward or away from the core *d*, against which and the knife the throat-slide brings up when forced into the mold.

The object of making the throat-slide in two parts is for convenience of setting or adjusting the blade or knife with respect to the core *d*. The halves of the matrix are shown at *e f* in Figs. 6 and 8.

The core *d* is constructed with a groove, *b'*, extending from its apex down or nearly down to its base, the object of so making the core with a groove being to cause the cutting-edge of the knife or blade *h*, when placed in the mold, to properly project beyond the inner surface of the pencil sharpener when cast, the position of the knife when in the groove being determined by an adjustable stopper gage, *k*, acting in concert with the base-plate *a*, the sections *i l*, and the grooved core *d*.

The gage-plate or gage *k* is shown in Figs. 1, 2, 3, and 4. It is a slotted plate, held upon the base *a* (in the situation as represented in the said figures) by a clamp-screw, *c'*.

When the two parts *i l* of the mold are placed on the base-plate or in a depression, *b'* thereof, they are to be turned around so as to bring the throat-slide A against the gage *k*. In this way the blade will be brought into the groove *b* of the core, its situation in the groove being determined by the position of the gage *k*.

In connection with the mold, a pair of spring nippers or forceps, *g*, are used, they being applied to one section *i* of the mold and so as to slide longitudinally into it. Fig. 12 exhibits a top view of these spring-nippers, they being arranged as shown at $g'$ $g^2$ in said figure—that is to say, on opposite sides of a slider, $h^2$, whose outer end serves to support the back of the blade or cutter and to advance the cutter into its proper place in the groove of the core, when the nippers are moved and are in the act of grasping the blade or cutter between them.

Besides a contrivance for grasping and holding the blade in the mold, it becomes necessary to have a support for the back of the blade and a means of moving the blade forward up to the throat-slide preparatory to the sectional part *i* being placed on the base *a*. Otherwise it would be very difficult to so nicely adjust the blade as to cause it to stand in the proper position for cutting after the formation of the cast body upon it.

For the purpose of fixing the blade in the nippers, the part *i* is to be held in one hand of a person and the nippers forced forward sufficiently to receive a blade. The blade is next to be placed between them, and they are to be drawn backward until its back is brought against or nearly against the inner surface of the mold. Next, the slider J′ is to be moved inward to the position it is to take in the mold, such position being determined by a pin, *l′*, and slot *m*. (See Figs. 6 and 8.) Next, the nippers, with their slider $h^2$, are to be moved forward so as to carry the blade up against the throat-slide J′, the part $h^2$ serving to sustain the back of the blade in its proper position. Each half of the matrix is furnished with a spud-passage, *n′*, into which, when the parts of the mold are properly arranged, melted metal may be poured for the purpose of casting the body of the pencil-sharpener upon the knife, and at the same time forming such body with a chip-throat, *a′*.

After the article has been cast in the mold the throat-slide should be drawn backward out of the casting and the sectional parts *i l* lifted from the base *a* of the mold, so as to separate the core from the casting. Next, the ring *m* should be removed from the sectional parts *i l*, and the spring-nippers *g* should be pulled backward out of the casting. This having been done, the parts *i l* may be separated and the casting removed from the mold.

For the purpose of withdrawing the throat slide or slides, a lever or pry, *m*, Fig. 13, may be used, or nippers or any other convenient device may be employed, such article becoming necessary, as the mold while in use becomes so heated after a few castings have been made in it as to render the throat-slides too hot to be seized by the fingers of a workman.

Having thus described my invention, what I claim is as follows:

1. In combination with the matrix for casting or forming the hollow, conical, or bell shaped body of a pencil-sharpener, essentially as described, a device or mechanism for holding the blade in the matrix, and one for forming the chip-throat of such blade and body during the process of casting or founding the said body on the blade, as specified.

2. In combination with a device or mechanism for holding the blade in the matrix, a slider or device for supporting its back while such blade is in contact with the core and the throat-slide or former.

3. Making the core *d* with a groove, *b′*, arranged in its outer surface, in manner and for the purpose as set forth, or, in other words, combining with the said core and the mechanism for holding the blade a groove arranged in the core substantially in the manner and for the purpose specified.

4. The mode of making the throat-slide or chip-mouth former A—viz, in two parts or plates, *j p*, applied, respectively, to the two parts or sections *i l* of the mold, essentially in manner and for the purpose as described.

5. Combining with the base *a*, its core *d*, and the parts *i l* of the mold, when applied to each other substantially as described, an adjustable gage or stop, *k*, arranged on the base-plate, or in other respects, so as to operate essentially as set forth.

In testimony whereof I have hereunto set my signature.

WALTER K. FOSTER.

Witnesses:
R. H. EDDY,
F. P. HALE, Jr.